(12) United States Patent
Vitagliano

(10) Patent No.: US 9,918,588 B2
(45) Date of Patent: Mar. 20, 2018

(54) AUXILIARY BARBECUE DEVICE

(71) Applicant: Santiago Vitagliano, Coral Gables, FL (US)

(72) Inventor: Santiago Vitagliano, Coral Gables, FL (US)

( * ) Notice: Subject to any disclaimer, the term of this patent is extended or adjusted under 35 U.S.C. 154(b) by 283 days.

(21) Appl. No.: 14/886,073

(22) Filed: Oct. 18, 2015

(65) Prior Publication Data

US 2017/0105576 A1    Apr. 20, 2017

(51) Int. Cl.
*A47J 37/06* (2006.01)

(52) U.S. Cl.
CPC ................ *A47J 37/0694* (2013.01)

(58) Field of Classification Search
USPC .................................. 99/425, 446
See application file for complete search history.

(56) References Cited

U.S. PATENT DOCUMENTS

| | | | |
|---|---|---|---|
| 3,842,726 A * | 10/1974 | Fautz | A47J 37/0682 99/425 |
| 4,909,137 A | 3/1990 | Brugnoli | |
| 5,009,151 A * | 4/1991 | Hungerford | A47J 37/0786 126/25 R |
| 5,044,266 A | 9/1991 | Geogaris | |
| 5,105,725 A * | 4/1992 | Haglund | A47J 37/067 126/25 R |
| D373,285 S * | 9/1996 | Coroama | D7/359 |
| 6,415,710 B1 * | 7/2002 | Boone | A47J 37/0611 99/375 |
| 6,520,174 B1 | 2/2003 | Scigliuolo | |
| 7,301,127 B1 | 11/2007 | Derridinger, Jr. | |
| 8,109,263 B2 | 2/2012 | Pliml | |
| 8,222,575 B2 | 7/2012 | Lin | |
| 8,584,580 B2 | 11/2013 | Barrett | |
| 8,602,018 B2 | 12/2013 | Johnston | |
| D706,577 S * | 6/2014 | Funnell, II | D7/354 |
| 2003/0041744 A1 | 3/2003 | Stephen et al. | |
| 2009/0064872 A1 * | 3/2009 | Zisserson | A47J 37/0694 99/450 |
| 2009/0308374 A1 | 12/2009 | Ahmed | |
| 2012/0266856 A1 | 10/2012 | Zelek et al. | |
| 2013/0108750 A1 * | 5/2013 | Vitagliano | A47J 37/0704 426/312 |
| 2013/0224359 A1 * | 8/2013 | Cretors | A47J 37/049 426/523 |
| 2014/0352551 A1 * | 12/2014 | Ducate | A47J 37/0704 99/339 |
| 2015/0245740 A1 * | 9/2015 | Garcia | A47J 37/0704 126/25 A |
| 2015/0265097 A1 * | 9/2015 | Poon | A47J 37/0694 99/425 |

* cited by examiner

*Primary Examiner* — Nina Bhat

(57) ABSTRACT

An auxiliary barbecue device has been designed to improve the process of cooking meat simply and conveniently. The auxiliary cooking device includes a rectangular frame designed to support the food where said rectangular frame has four lateral sides, a left side, a right side, a lower side, and an upper side. The auxiliary cooking device described can be made of cast iron or enameled cast iron.

14 Claims, 7 Drawing Sheets

AUXILIARY BARBECUE DEVICE

BACKGROUND OF THE INVENTION

Field of the Invention

The invention disclosed in the instant application generally relates to cooking device and more specifically it is directed to an auxiliary barbecue device designed to improve the process of barbecueing. In the specific the auxiliary cooking device of the present application improves over the prior art by providing two openings, a lower opening and an upper opening, and a grooved cooking surface. The upper opening is a vent that channels the smoke from the charcoal away from the food, the lower opening allows for the deployment of a grease trap, and the grooved cooking surface collects the melted grease and funnels into the lower openings.

Brief Description of the Prior Art

Barbecue devices are well known in the art. Various Patents and Published Patent applications are in fact directed to barbecue cooking devices. While developing the invention of the instant application independently the Inventor researched extensively the public record as well as the current market for auxiliary barbecue devices and the most relevant examples found in the search are mentioned in the Information Disclosure Statement (IDS) attached.

Despite all the efforts listed above prior art patents describe structures that are either not truly convenient or else involve complicated, expensive, and overly difficult assembly and/or disassembly parts and procedures. These shortfalls make that no device currently known or previously disclosed can improve the cooking process on a barbecue by venting the smoke off the food and funneling the grease away from the charcoal and or flame source by evening out the heat coming from it. Other devices have been advertised on various media but never patented or described into a printed publication.

SUMMARY OF THE INVENTION

The invention disclosed in the instant application generally relates to cooking device and more specifically it is directed to an auxiliary barbecue device designed to improve the process of barbecueing. In the specific the auxiliary cooking device of the present application improves over the prior art by providing two openings, a lower opening and an upper opening, and a grooved cooking surface. The upper opening is a vent that channels the smoke from the charcoal away from the food, the lower opening allows for the deployment of a grease trap, and the grooved cooking surface collects the melted grease and funnels into the lower openings.

It is then the principal object of the present invention is to improve the cooking process over a barbecue by venting the charcoal smoke away from the food. It is a secondary objective of the present invention to channel the grease from the meat away from the fire into a grease trap. It is a further objective of the auxiliary cooking device for a barbecue of the present application to allow for a uniform amount of heath to be transferred to the meat, thus allowing the cook for a better control of the cooking process.

It is an additional objective of the present invention to provide a device that does not rust, or deteriorates over time. It is also an objective achieved by the auxiliary cooking device of the present invention to allow the cook to remove the excess grease as it flows into the grease trap. It is a final objective of the present invention to provide for a device that is inexpensive to build, but that can eventually be sold at a premium while being dishwasher safe.

These and other objective achieved by the device of the present invention will be apparent by the drawings, by their detailed description, and by the specification here from appended.

DESCRIPTION OF THE PREFERRED EMBODIMENT

Figure 1:
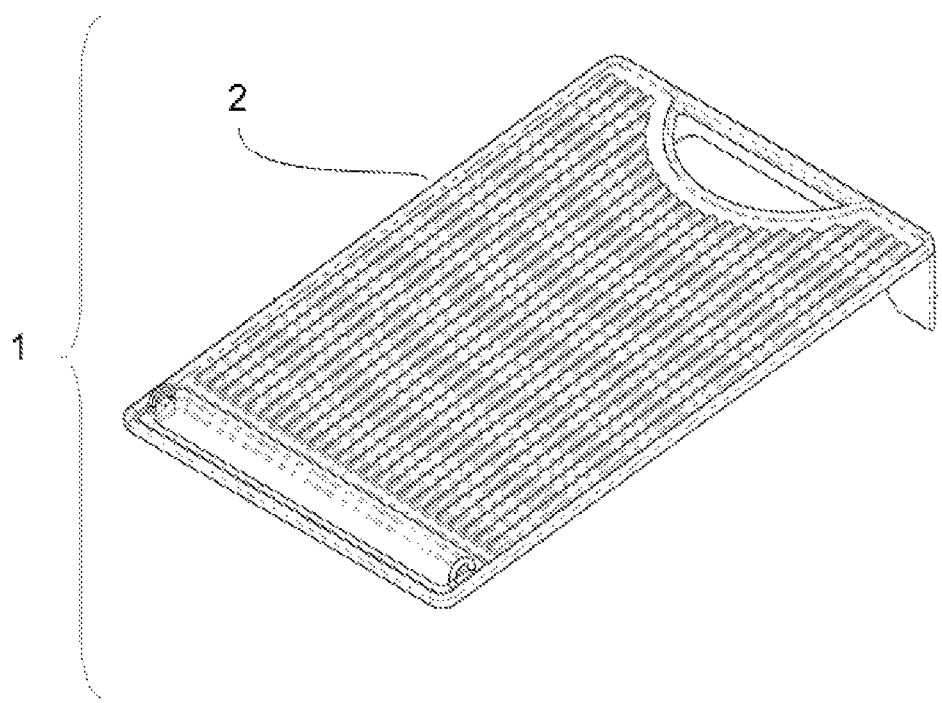
FIG. 1 is a first perspective view of one of the preferred embodiments of the auxiliary cooking device in accordance with the teachings of the present invention.
Figure 2:
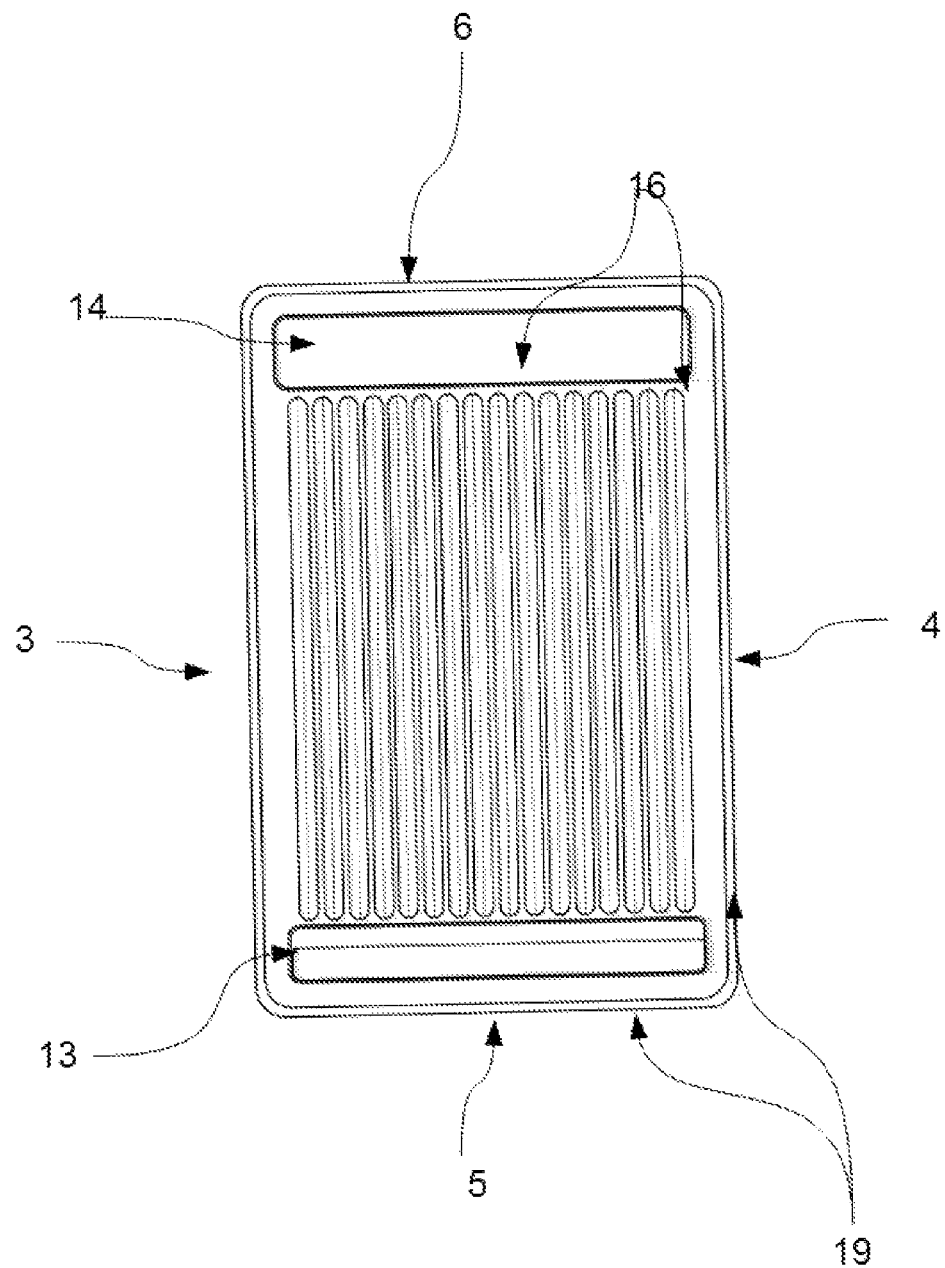
FIG. 2 is a top elevation view of the auxiliary cooking device of FIG. 1.
Figure 3:
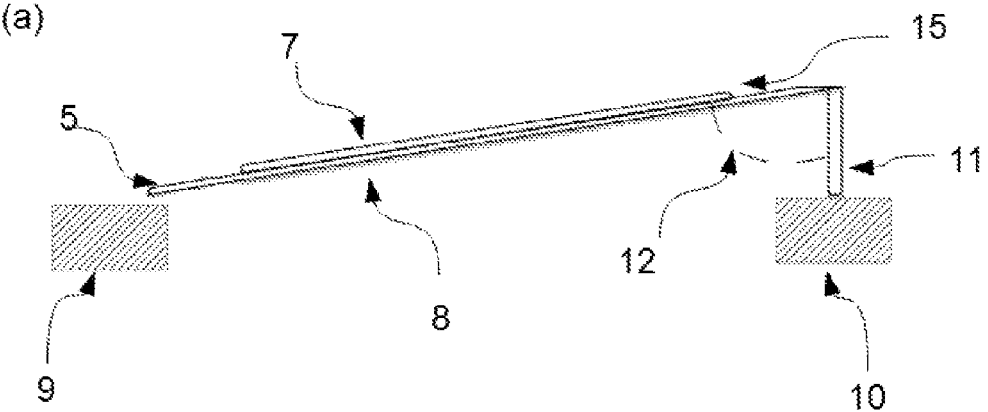
FIG. 3 is a left side elevation view of the auxiliary cooking device of FIG. 1 without the grease trap (a) and with the grease trap (b).
Figure 3:
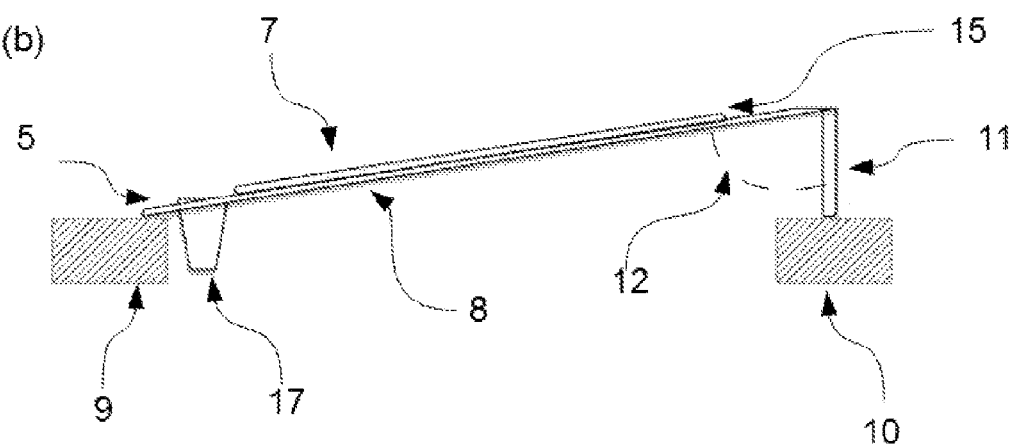
Figure 4:
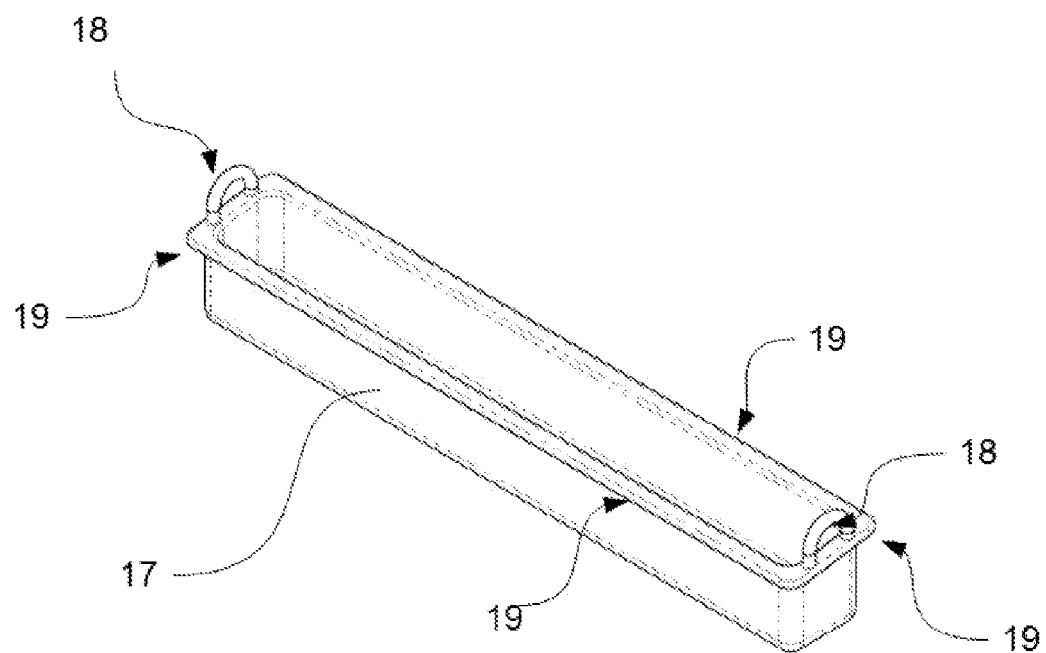
FIG. 4 is a top perspective view of the grease trap designed to be inserted in said lover opening of the auxiliary cooking device of FIG. 1.
Figure 5:
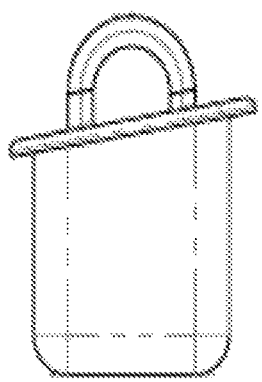
FIG. 5 is a left side elevation view of the grease trap of FIG. 4.
Figure 6:
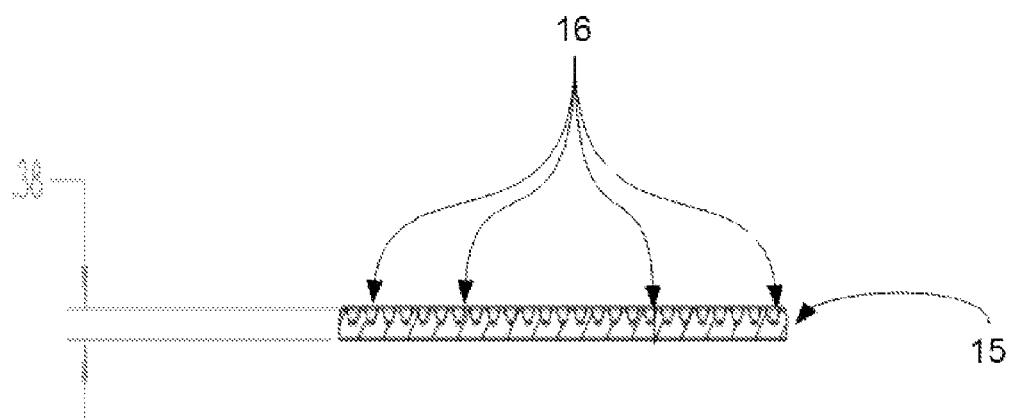
FIG. 6 is a cross section view of said cooking pan installed on said top surface of the auxiliary cooking device of FIG. 1 showing the cross section of the grooves running longitudinally across it.

The invention disclosed in the instant application generally relates to cooking device and more specifically it is directed to an auxiliary barbecue device designed to improve the process of barbecueing. In the specific the auxiliary cooking device of the present application improves over the prior art by providing two openings, a lower opening and an upper opening, and a grooved cooking surface. The upper opening is a vent that channels the smoke from the charcoal away from the food, the lower opening allows for the deployment of a grease trap, and the grooved cooking surface collects the melted grease and funnels into the lower openings.

The inventor commonly refers to the device object of the present application as the: "Gaucho Grill". As it can be inferred from the drawings essential components of the auxiliary cooking device for a barbecue (1) include: a rectangular frame (2) designed to support the food where said rectangular frame (2) has four lateral sides, a left side (3) a right side (4) a lower side (5) and an upper side (6). Said rectangular frame (2) has two surfaces: a top surface (7), and a bottom surface (8). The top surface is designed to support the food, specifically barbecue meat, but also vegetable, eggs, poultry, fish, and pizzas. Said bottom surface is designed to be exposed to the heat of the grilling elements including gas, charcoal, and others. Retrofitability: the Gaucho Grill can be adapted to fit on top of commercially available grills because of empty triangular sides (left side triangular opening (19) and right side triangular opening (20) not shown in the drawings but specular to left side triangular opening (19) on the right side), that allow it to be installed on top or in lieu of a regular grill.

Barbecue is a term in the English language broadly referred both a cooking method and an apparatus. Barbecue encompasses different techniques including grilling and smoking. The generally accepted differences between barbecuing and grilling are the cooking times and the types of heat used. Grilling is generally done quickly over moderate-to-high direct heat with little smoke, while barbecuing is done slowly over low indirect heat and the food is flavored by the smoking process.

The word barbecue, when used as a noun, can refer to the cooking method, the meat cooked in this way, or to the cooking apparatus itself (the "barbecue grill" or simply "barbecue"). Used as an adjective, barbecued refers to foods cooked by this method. The term is also used as a verb for the act of cooking food in this manner. Barbecuing is usually done in an outdoor environment by smoking the meat over wood or charcoal.

In the present application the inventor is mainly referring to the grilling process where meat is cooked over medium or intense heat generated by a heath source. Common heath sources used in grilling are charcoal, gas, burned wood, or a mix of them thereof. A specialty of grilling is the "parrillada" a mixed grill of charcoal-broiled meats that includes chorizo, morcilla (blood sausage), panceta (a thick-cut, unsmoked bacon), mollecas (sweetbread), and veal breast. Seasoned with salt, the meats are turned on an olive-oil brushed grill and slow-cooked until tender. Sliced and served on a communal platter, parrillada or parrillada mixta is accompanied by bread, grilled vegetables, and salad.

When grilling over regular grill the, depending on the styles, smoke may or may not be welcome. In general for regular grilling it's not. Therefore it would be desirable to have a device that channels the smoke away from the meat. The device of the present application, namely the "Gaucho grill" has a rectangular frame placed at an angle where the smoke coming from the charcoal is channeled trough an upper opening. Because smoke is usually hot and tents to move upward it is unlikely that smoke could come back onto the meats. Additionally polycyclic aromatic hydrocarbons, or PAHs, are produced through certain types of combustion, such as the burning of coal or wood. A common problem is created when fat from meat drips onto a fire, generating a flare and smoke, and ultimately allowing the PAHs to affix themselves to the food while it's cooking, increasing, to some degree, the carcinogenic risk.

Additionally on a regular grill grease from the meat of from the sausages melts away into the charcoal catching on fire or gas burners. The flames produced by the grease may burn the outside of the meat or of the sausages, thus ruining their external appearance, and eventually inducing the cook to leave the inside undercooked. The rectangular frame of the auxiliary cooking device described in the present application prevents that, effectively channeling the grease dripping from the meat into a grease trap, and mechanically separating the food from the residual flames that may spark in the charcoal while all along providing a uniform heat distribution.

Said rectangular frame (2) is designed to make contact with front external support (9) and back external support (10) respectively with said lower side (5) and with back panel (11). In a first preferred embodiment of the Gaucho Grill of the present application said rectangular frame (2) is held in place by gravity. On the other hand in other embodiments of the present application said rectangular frame (2) can be held in place by a locking mechanism. Said locking mechanism can be either a separate unit, such as a spring activated locking mechanism held in place, for example, on said back panel, by screws, nuts, or bolts; or said locking mechanism can be literally embedded into critical portions of the Gaucho Grill such as said lower side (5) and with back panel (11) as a magnet, or a plurality of magnets. Said front external support (9) and back external support (10) are part of the grilling machine itself and may not necessarily included the Gaucho Grill of the present application. In other words the Gaucho Grill is designed to be laid on top of a regular grill or barbecue, from there the need for the designation of "auxiliary".

Back panel (11) is attached to said upper side (6) of said rectangular frame to form angle (12). In general the amplitude of angle (12) is not critical but it becomes critical for specific embodiments of the Gaucho Grill designed to fit on commercially available grilling machine. Said angle (12) formed by the intersection of said lower side (5) and said back panel (11) can be an acute angle, or an obtuse angle. In a separate preferred embodiment of the auxiliary grilling device of the present application where said left side (3) a right side (4) are both 19.72 inches (50.01 cm), said back panel (11) is 3 inches (7.62 cm), and said lower side (5) and an upper side (6) are both 12.75 inches (32.385 cm), said acute angle (12) is a 81 degree angle. The dimensions of this embodiment are critical since they describe an embodiment that has relevant commercial applications.

Figure 7:
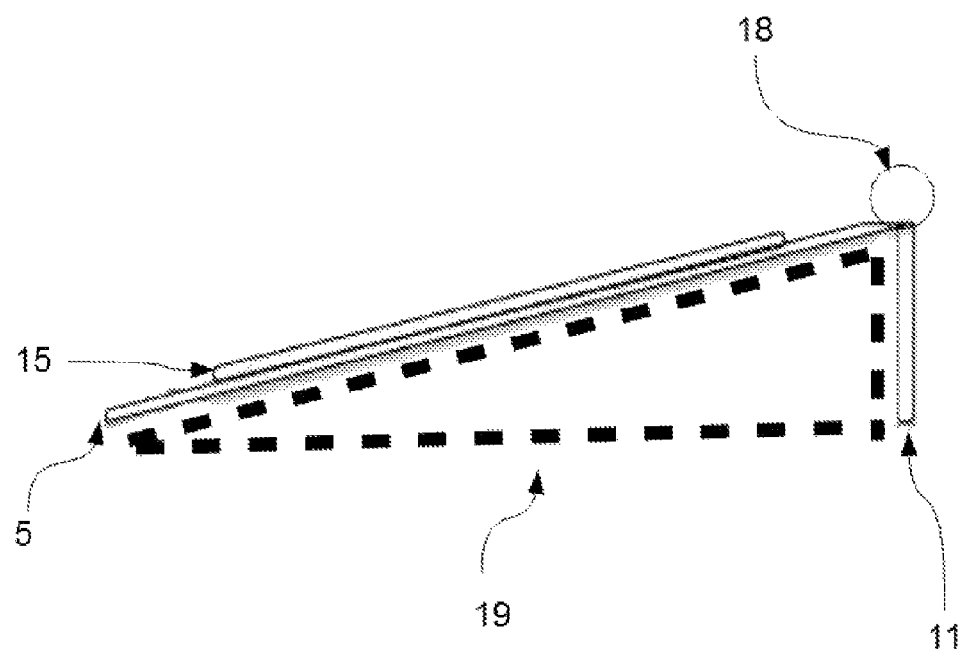
FIG. 7 is a left side elevation view of a separate embodiment of the auxiliary cooking device of the present application featuring a hinge in between said rectangular frame and said back panel.

Alternatively as shown in FIG. 7 said upper side (6) of said rectangular frame (2) and said back panel (11) may be hingedly connected by hinge (18) therefore said angle (12) formed by the intersection of said lower side (5) and said back panel (11) can vary in its amplitude. Said hinge holding together said upper side (6) of said rectangular frame (2) and said back panel (11) may be greased with fire resistant lubricating grease such as for example an ester based poliol.

In a preferred embodiment of the auxiliary cooking device of the present application said rectangular frame (2) has two openings (13, 14) cutting across both said top surface (7) and said bottom surface (8). A first opening (13) is located close to said lower side (5) and an upper opening (14) located close to said upper side (6). The shape of the openings is rectangular, square, or arc shaped. Said upper opening (14) may be a vent designed to favor the escape of the smoke produced by the charcoal is rectangular in shape. Said upper opening (14) may be constituted by a plurality of smaller openings angles to facilitate the extraction of the smoke. More particularly the open portion of said top surface (7) may be larger of the corresponding opening on said bottom surface (8). Alternatively the open portion of said bottom surface (8) may be larger of the corresponding opening on said top surface (7). Said upper opening (14) may also serve as a handle when designed as an arc.

In an alternative embodiment of the auxiliary cooking device of the present application a cooking pan (15) may laid on top of said top surface (7); where longitudinally placed grooves (16) runs along said cooking pan (15) parallel to said left side (3) and said right side (4). Said longitudinally placed grooves channel the grease that melt from the meat and from the sausages to said first opening (13) located close to said lower side (5) and ultimately to a grease trap (17). In fact in a separate preferred embodiment the auxiliary cooking device of the present application further comprises grease trap (17) designed to be inserted into said first opening (13) underneath said longitudinally placed grooves (16) and held in place by gravity; where said grease trap (17) is supported by the four edges (19) running around the perimeter of its top opening, where said four edges extend horizontally over said top surface (7). Said grease trap (17) may be topped by a filter, such as a net that lets percolates only the liquid grease and retains solid particles. Said grooves may be either U or V shaped.

As said grease trap (17) may be filled up with grease during cooking and the grease may constitute a fire hazard, in a second preferred embodiment of the auxiliary cooking device of the present application, said grease trap (17) is removable via handles (18).

The heath distribution in a regular fire grill is uneven and may be affected by flares, flames, and spurs generated by a sudden breeze passing over the burning coal. While it's up to the cook to handle the cooking carefully by moving around the meats thus redistributing the less cooked in an area with higher heat, and the more cooked in an area subject to less heath, the gaucho grill of the present application helps to normalize the heat distribution (cooking) process by mechanically separating the heat source from the meats via said rectangular frame (2). Nevertheless the heat still must be distributed to the meats to cook them up. Therefore said rectangular frame (2) must be made of a material that is a good heat conductor. Good heath conductors include metals, such as gold, platinum, iron, copper, aluminum and the like. Additionally said rectangular frame (2) must be heat resistant and able to be fabricated cheaply. A final characteristic of said rectangular frame (2) is that it must be non sticky.

Therefore in one of the preferred embodiments of the auxiliary cooking device of the present application said rectangular frame (2) is made of cast iron. Cast iron is a group of iron-carbon alloys with a carbon content greater than 2%. The alloy constituents affect its colour when fractured: white cast iron has carbide impurities which allow cracks to pass straight through. Grey cast iron has graphite flakes which deflect a passing crack and initiate countless new cracks as the material breaks. Carbon (C) and silicon (Si) are the main alloying elements, with the amount ranging from 2.1-4 wt % and 1-3 wt %, respectively. Iron alloys with less carbon content are known as steel. While this technically makes these base alloys ternary Fe—C—Si alloys, the principle of cast iron solidification is understood from the binary iron-carbon phase diagram. Since the compositions of most cast irons are around the eutectic point of the iron-carbon system, the melting temperatures closely correlate, usually ranging from 1,150 to 1,200° C. (2,100 to 2,190° F.), which is about 300° C. (572° F.) lower than the melting point of pure iron.

Cast iron tends to be brittle, except for malleable cast irons. With its relatively low melting point, good fluidity, castability, excellent machinability, resistance to deformation and wear resistance, cast irons have become an engineering material with a wide range of applications and are used in pipes, machines and automotive industry parts, such as cylinder heads (declining usage), cylinder blocks and gearbox cases (declining usage). It is resistant to destruction and weakening by oxidation (rust). Cast iron's ability to withstand and maintain very high cooking temperatures makes it a common choice for searing or frying, and its excellent heat retention makes it a good option for long-cooking stews or braised dishes. Because cast iron skillets can develop a "non-stick" surface, they are also a good choice for egg dishes. Other uses of cast iron pans include baking, for instance for making cornbread, cobblers and cakes.

Most bare cast iron pots and pans are cast as a single piece of metal, including the handle. This allows them to be used on both the stovetop and in the oven. Many recipes call for the use of a cast iron skillet or pot, especially so that the dish can be initially seared or fried on the stovetop then transferred into the oven, pan and all, to finish baking. Likewise, cast iron skillets can double as baking dishes. Cast iron is a very slow conductor of heat and forms hot spots if heated too quickly, or on an undersized burner; however, it has excellent heat retention properties, and the entire pan will eventually become extremely hot, including the iron handle or handles.

Said cast iron may be enameled. Cast iron cookware has excellent heat retention properties, and can be produced and formed with a relatively low level of technology. Seasoning is used to protect bare cast iron from rust and to create a non-stick surface.

Bare cast iron vessels have been used for cooking for over two thousand years. Cast iron cauldrons and cooking pots were treasured as kitchen items for their durability and their ability to retain heat, thus improving the quality of cooking meals. In Europe, before the introduction of the kitchen stove in the middle of the 19th century, meals were cooked in the hearth or fireplace, and cooking pots and pans were designed for use in the hearth. This meant that all cooking vessels had to be designed to be suspended on, or in, a fireplace. Cast iron pots were made with handles to allow them to be hung over a fire, or with legs so that they could stand up in the fireplace. In addition to dutch ovens, which were developed with the onset of the Industrial Revolution, a commonly used cast iron cooking pan called a spider had a handle and three legs used to stand up in the coals and ashes of the fire. Cooking pots and pans with legless, flat bottoms were designed when cooking stoves became popular; this period of the late 19th century saw the introduction of the flat cast iron skillet.

Cast iron cookware was especially popular among homemakers and housekeepers during the first half of the 20th century. Most American households had at least one cast iron cooking pan, as they were especially popular. The 20th century also saw the introduction and popularization of enamel-coated cast iron cookware. Under the teachings of the present application the cast iron is formed by 2-4% in weight of carbon, 1-3% in weight of silicon, balance iron. Said cooking pan (15) may be preferably 0.38 inches (1 cm) thick to mediate and uniformly redistribute the heat.

For safety the auxiliary cooking device described in the present application further comprises protective band (19) covering said left side (3), right side (4), lower side (5) and upper side (6) and may have the corners respectively formed by said left side (3) with said lower side (5), said left side with said upper side (6), said right side (4) with lower side (5), and said right side with upper side (6) rounded. In As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cooking device comprising a rectangular frame made of cast iron having a composition of 2-4% in weight of carbon, 1-3% in weight of silicon, balance iron; where said cooking device is designed to support the food, and where said rectangular frame has four lateral sides, a left side with a length of 19.72 inches (50.01 cm), a right side with a length of 19.72 inches (50.01 cm), a lower side with a length of 12.75 inches (32.385 cm), and an upper side with a length of 12.75 inches (32.385 cm); where said rectangular frame has two surfaces: a top surface, and a bottom surface; where said rectangular frame is designed to make contact with front external support and back external support respectively with said lower side and with a back panel having a length of 3 inches (7.62 cm); where said left side and said back panel of said rectangular frame forms a left side triangular opening; where said right side and said back panel of said rectangular frame forms a right side triangular opening; where said back panel is attached to said upper side of said rectangular frame to form an acute angle of 81 degrees; where said rectangular frame has two openings cutting across both said top surface and said bottom surface, a first opening close to said lower side and an upper opening close to said upper side; and cooking pan made of cast iron 0.38 inches (1 cm) thick laid on top of said top surface wherein longitudinally placed grooves run along said cooking pan parallel to said left side and said right side of said frame.

2. The cooking device of claim 1 where said cast iron is enameled.

3. The cooking device of claim 1 further comprising a grease trap constructed and arranged underneath said longitudinally placed grooves wherein said grease trap is supported by the edges of said top surface.

4. The cooking device of claim 3 wherein said grease trap includes handles.

5. The cooking device of claim 4 wherein grease trap is removable.

6. The cooking device of claim 1 where said angle formed by the intersection of said lower side and said back panel is an obtuse angle.

7. The cooking device of claim 1 where said lower side and said back panel are hingedly connected by hinge.

8. The cooking device of claim 7 where said angle formed by the intersection of said lower side and said back panel is a variable angle.

9. The cooking device of claim 1 further comprising protective band covering said left side, right side, lower side and upper side.

10. The cooking device of claim 1 where the corners respectively formed by said left side with said lower side, said left side with said upper side, said right side with lower side, and said right side with upper side are rounded.

11. The cooking device of claim 1 where said longitudinally placed grooves form a repeating U shaped cross sectional pattern.

12. The cooking device of claim 1 where said longitudinally placed grooves form a repeating V shaped cross sectional pattern.

13. The cooking device of claim 1 where said upper opening is a vent.

14. The cooking device of claim 13 where said vent is rectangular in shape.

* * * * *